US012110850B2

(12) United States Patent
Kosaka

(10) Patent No.: US 12,110,850 B2
(45) Date of Patent: Oct. 8, 2024

(54) PRESSURE REGULATION DEVICE

(71) Applicant: SUBARU CORPORATION, Tokyo (JP)

(72) Inventor: Shunichi Kosaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 7 days.

(21) Appl. No.: 18/088,332

(22) Filed: Dec. 23, 2022

(65) Prior Publication Data

US 2023/0228233 A1 Jul. 20, 2023

(30) Foreign Application Priority Data

Jan. 17, 2022 (JP) ................................ 2022-005253

(51) Int. Cl.
*F02M 37/46* (2019.01)
*F02M 21/02* (2006.01)
*F02M 37/50* (2019.01)

(52) U.S. Cl.
CPC ........ *F02M 37/46* (2019.01); *F02M 21/0239* (2013.01); *F02M 37/50* (2019.01)

(58) Field of Classification Search
None
See application file for complete search history.

(56) References Cited

U.S. PATENT DOCUMENTS 3,862,035 A * 1/1975 Goodman .............. B01D 29/54 210/791
4,629,569 A * 12/1986 Gimbel .................. B01D 29/01 210/488
6,247,486 B1 * 6/2001 Schwegler ............. B01D 29/21 137/115.27
7,134,568 B2 * 11/2006 Moriyama ............. F02M 37/50 220/563
9,821,255 B2 * 11/2017 Ribarov .................. F02M 37/34
10,302,059 B2 * 5/2019 Caceres ............... F02M 61/165
2006/0016741 A1 * 1/2006 Moriyama ............. F02M 37/24 210/172.3
2011/0174704 A1 * 7/2011 Yamada ............... B01D 29/114 210/489
2016/0031566 A1 * 2/2016 Ribarov ................. B01D 35/18 210/336
2023/0228233 A1 * 7/2023 Kosaka .............. F02M 21/0239 123/434

(Continued)

FOREIGN PATENT DOCUMENTS

AU 2005202223 A1 * 2/2006 ........... B60K 15/077
AU 2005270921 A1 * 2/2006 ........... B01D 29/114

(Continued)

*Primary Examiner* — Kevin R Steckbauer
(74) *Attorney, Agent, or Firm* — MCGINN I.P. LAW GROUP, PLLC

(57) ABSTRACT

A pressure regulation device is configured to regulate a pressure of a fluid that flows in the pressure regulation device. The pressure regulation device includes a fluid flow passage, a fluid regulator, and at least one wall member. The fluid flow passage is a passage in which the fluid flows. The fluid regulator is disposed in the fluid flow passage, and configured to regulate a pressure of the fluid. The at least one wall member is disposed upstream of the fluid regulator in a flow of the fluid, and stands from an interior wall of the fluid flow passage.

5 Claims, 4 Drawing Sheets

(56) References Cited

U.S. PATENT DOCUMENTS

| | | | | | |
|---|---|---|---|---|---|
| 2023/0302382 | A1 * | 9/2023 | Yokota | .................. | B01D 39/10 |

FOREIGN PATENT DOCUMENTS

| | | | | | |
|---|---|---|---|---|---|
| CN | 101257956 | A * | 9/2008 | ............. | B01D 29/21 |
| CN | 207527054 | U * | 6/2018 | | |
| DE | 4430471 | A1 * | 2/1996 | ........... | B01D 35/157 |
| DE | 19536084 | A1 * | 4/1997 | ............. | B01D 29/21 |
| FR | 2873330 | A1 * | 1/2006 | ........... | B60K 15/077 |
| JP | 2011169310 | A * | 9/2011 | ............. | B01D 29/01 |
| JP | 5126321 | B2 * | 1/2013 | ............. | B01D 29/01 |
| WO | WO-9607025 | A1 * | 3/1996 | ........... | B01D 35/157 |
| WO | WO-9712143 | A1 * | 4/1997 | ............. | B01D 29/21 |
| WO | WO-2022123953 | A1 * | 6/2022 | ............. | B01D 29/03 |

* cited by examiner

PRESSURE REGULATION DEVICE

CROSS-REFERENCE TO RELATED APPLICATIONS

The present application claims priority from Japanese Patent Application No. 2022-005253 filed on Jan. 17, 2022, the entire contents of which are hereby incorporated by reference.

BACKGROUND

The present disclosure relates to a pressure regulation device.

An example of existing techniques related to pressure regulation devices is described in Japanese Unexamined Patent Application Publication (JP-A) No. 2011-169310.

In a pressure regulation device described in JP-A No. 2011-169310, a metallic tube is led out from a fuel tank. A pressure regulation device is led out to the metallic tube. A vaporized fuel passes into the metallic tube. When the internal pressure of the fuel tank becomes greater than or equal to a predetermined value, the pressure regulation device opens. This allows the gas in the fuel tank to be released to the external environment via the metallic tube.

The pressure regulation device described above employs a metallic steel tube to regulate the pressure of the fuel tank. In recent years, synthetic resin tubes have been used instead of steel tubes for their superior workability and cost-effectiveness.

SUMMARY

An aspect of the disclosure provides a pressure regulation device configured to regulate a pressure of a fluid that flows in the pressure regulation device. The pressure regulation device includes a fluid flow passage, a fluid regulator, and at least one wall member. The fluid flow passage is a passage in which the fluid flows. The fluid regulator is disposed in the fluid flow passage, and configured to regulate a pressure of the fluid. The at least one wall member is disposed upstream of the fluid regulator in a flow of the fluid, and stands from an interior wall of the fluid flow passage.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

The pressure regulation device described above has room for improvement from the viewpoint of ensuring safe valve operation.

For example, inside the resin tube, extracts arise from the synthetic resin constituting the resin tube. Such extracts pass into the pressure regulation device, together with a vaporized fuel. When such extracts enter the pressure regulation device, the extracts may impede the operation of the internal mechanism of the pressure regulation device. This may hinder proper regulating action of the pressure regulation device.

It is desirable to provide a pressure regulation device capable of reducing entry of extracts.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
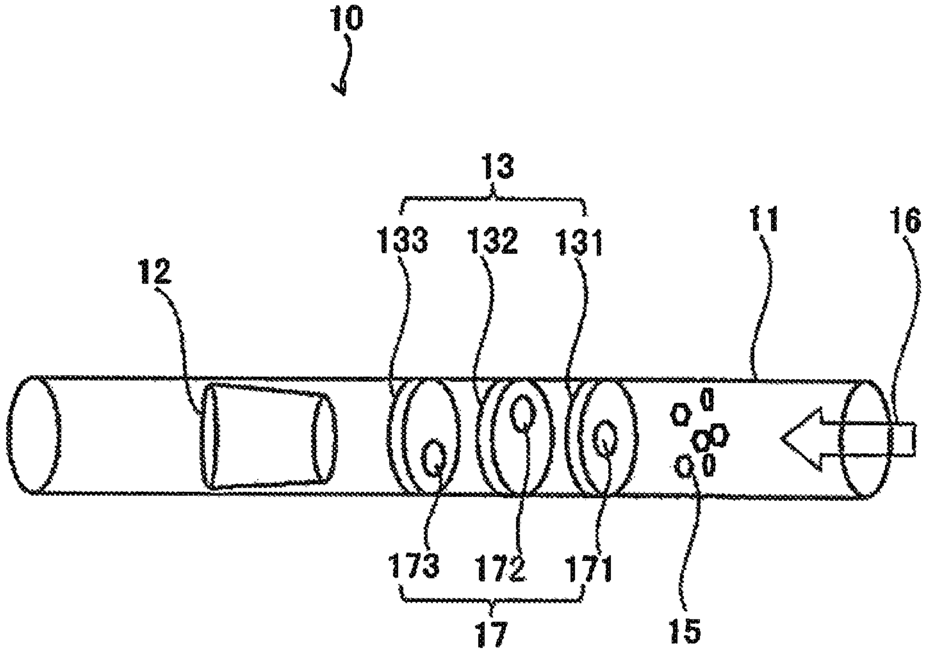
FIG. 1 is a schematic diagram illustrating a pressure regulation device according to an embodiment of the present disclosure.

A pressure regulation device 10 according to an embodiment of the present disclosure will now be described with reference to the drawings. FIG. 1 is a schematic diagram illustrating the pressure regulation device 10.

The pressure regulation device 10 is incorporated into a path through which a vaporized fuel passes in a tank-pressure regulation device 18 that will be described later. The pressure regulation device 10 is configured to regulate the internal pressure of a fuel tank 20. In one example, the pressure regulation device 10 includes the following major components: a fluid flow passage 11, a fluid regulator 12, and wall members 13.

The fluid flow passage 11 is a conduit in which a fluid 16 flows. The fluid flow passage 11 is made of, for example, synthetic resin. In one example, the fluid flow passage 11 has a substantially cylindrical shape with a substantially circular cross-section. An exemplary suitable material for the fluid flow passage 11 may be synthetic resin. This allows for increased freedom in the shape of the fluid flow passage 11, and further makes it possible to reduce cost. The fluid 16 is, for example, a gas. In one example, the fluid 16 is a vaporized fuel.

The fluid regulator 12 is disposed in the fluid flow passage 11 to regulate the pressure of the fluid 16. Opening the fluid regulator 12 allows the fluid 16 to flow via the fluid flow passage 11. Closing the fluid regulator 12 makes it possible to prevent passage of the fluid 16 into the fluid flow passage 11. An exemplary configuration of the fluid regulator 12 will be described later in more detail with reference to FIG. 2B.

The wall members 13 are disposed upstream of the fluid regulator 12 in the flow of the fluid 16. The wall members 13 stand from the interior wall of the fluid flow passage 11. In one example, the wall members 13 stand from the interior wall of the fluid flow passage 11 such that the wall members 13 extend from the interior wall toward the center of the fluid flow passage 11. If the fluid flow passage 11 has, for example, a cylindrical shape, the wall members 13 are substantially in the shape of a ring that extends inward from the interior surface of the fluid flow passage 11.

Due to the presence of the wall members 13, even if extracts 15 arise from the fluid flow passage 11 and appear inside the fluid flow passage 11, the extracts 15 can be captured by the wall members 13. Consequently, even if the extracts 15 flow toward the fluid regulator 12 together with the fluid 16, such extracts 15 are captured by the wall members 13. This helps to reduce the risk of the extracts 15 reaching the fluid regulator 12, and consequently prevent the extracts 15 from entering the fluid regulator 12. This in turn helps to reduce potential malfunction of the fluid regulator 12.

In particular, if the fluid flow passage 11 is made of synthetic resin, and the fluid 16 is a vaporized fuel that will be described later, flow of the fluid 16 in the fluid flow passage 11 causes the extracts 15 to arise in the fluid flow passage 11. Examples of the extracts 15 include oligomers and additives. If this situation is not addressed in some way, the extracts 15 may enter the fluid regulator 12, and impede the open/close action of the fluid regulator 12. According to the embodiment, the fluid flow passage 11 is provided with the wall members 13 so that the extracts 15 are captured by the wall members 13. This helps to reduce the risk of the extracts 15 entering the fluid regulator 12.

The wall members 13 are disposed in the direction of flow of the fluid 16. In one example, the wall members 13 include a wall member 131, a wall member 132, and a wall member 133 that are disposed in the stated order from upstream in the direction of flow of the fluid 16. The wall member 131, the wall member 132, and the wall member 133 are disposed at substantially equal intervals. This allows almost all of the extracts 15 to be captured by the wall members 131, 132, and 133, leading to a further reduction in the amount of the extracts 15 entering the fluid regulator 12.

The wall members 131, 132, and 133 can be formed simultaneously during manufacture of the fluid flow passage 11. That is, the wall members 131, 132, and 133 are molded integrally from the same synthetic resin as that used for the fluid flow passage 11. This helps to reduce an increase in manufacturing cost associated with the provision of the wall members 131, 132, and 133.

The presence of the wall members 131, 132, and 133 in the direction of flow of the fluid 16 allows the extracts 15 to be captured by each wall member 13 more effectively. This helps to more effectively reduce the risk of the extracts 15 adhering to the fluid regulator 12.

The wall members 13 each have a hole 17 through which the fluid 16 is allowed to flow toward the fluid regulator 12. In one example, a hole 171 extends through a portion of the wall member 131, a hole 172 extends through a portion of the wall member 132, and a hole 173 extends through a portion of the wall member 133.

In each of the wall members 13, the hole 17 is located at a different position. In one example, the hole 171 is located at the center of the wall member 131, the hole 172 is located in an upper portion of the wall member 132, and the hole 173 is located in a lower portion of the wall member 133. As a result, the fluid 16 flows through the holes 171, 172, and 173 in a meandering fashion. This allows a greater amount of the extracts 15 to deposit on the major surface of each of the wall members 131, 132, and 133, and consequently reduce the amount of the extracts 15 that pass through the wall members 13.

Figure 2A:
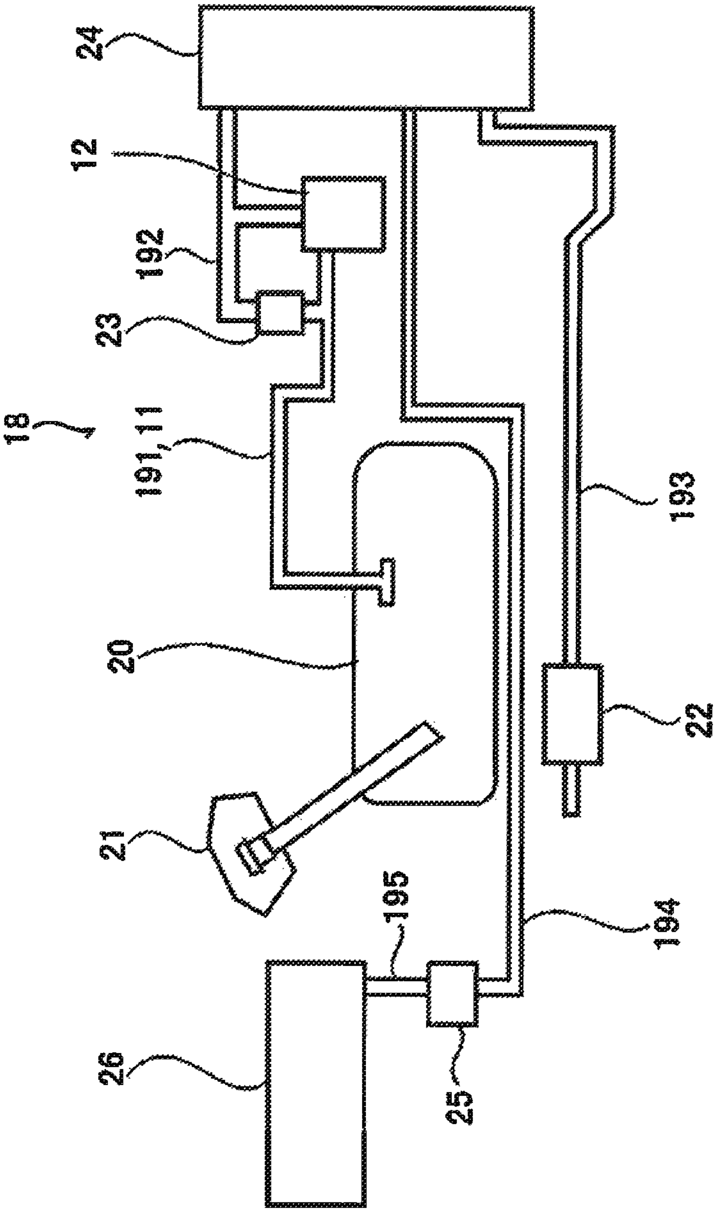
FIG. 2A is a schematic diagram illustrating a tank-pressure regulation device including the pressure regulation device according to the embodiment of the present disclosure.

FIG. 2A is a schematic diagram illustrating the tank-pressure regulation device 18 including the pressure regulation device 10. The pressure regulation device 10, and the fuel tank 20 are mounted to a vehicle such as a passenger car.

The tank-pressure regulation device 18 regulates the pressure in the fuel tank 20. Major components of the tank-pressure regulation device 18 include, but are limited to, the fluid regulator 12, a mechanical relief valve 23, a canister 24, and a purge valve 25.

An evaporated fuel path 191 or other such path is a conduit that couples various units constituting the tank-pressure regulation device outboard end 18 to each other, and is similar in structure to the pressure regulation device 10 illustrated in FIG. 1.

The fuel tank 20 is configured to store a fuel. Non-limiting examples of the fuel to be stored in the fuel tank 20 include gasoline and light oil.

A feeder 21 is configured to feed the fuel tank 20. To feed the fuel tank 20 with fuel, the feeder 21 is brought into an open state. Otherwise, the feeder 21 closes the fuel tank 20.

The mechanical relief valve 23 serves as a safety valve that, in response to the internal pressure of the fuel tank 20 exceeding a predetermined reference value, opens to allow gas to be released from inside the fuel tank 20 to the external environment. This helps to prevent the internal pressure of the fuel tank 20 from rising abnormally.

The fluid regulator 12 is, for example, a solenoid valve. Closing the fluid regulator 12 causes the fuel tank 20 to be hermetically closed. This helps to reduce release of a vaporized fuel from the fuel tank 20. Opening the fuel tank 20 causes the fuel tank 20 and the canister 24 to communicate with each other.

This allows the vaporized fuel in the fuel tank 20 to be released to the external environment via the canister 24. The internal pressure of the fuel tank 20 can be thus reduced.

The canister 24 includes an adsorbent made of activated carbon or other such material. The presence of the adsorbent allows the canister 24 to adsorb a vaporized fuel supplied form the fuel tank 20.

A filter 22 is configured to, in introducing outside air into the fuel tank 20 to diagnose the presence of a leak in the fuel tank 20, remove dust from the outside air.

The purge valve 25 is responsible for supplying fuel to an engine 26, which is either one of a gasoline engine and a Diesel engine. Opening the purge valve 25 allows a vaporized fuel adsorbed and collected by the canister 24 to be supplied to the engine 26.

The tank-pressure regulation device 18 includes evaporated fuel paths 191 to 194 to transport a vaporized fuel that has vaporized in the fuel tank 20. Areas located upstream in the flow of the vaporized fuel are herein referred to simply as upstream. Areas located downstream in the flow of the vaporized fuel are herein referred to simply as downstream.

The evaporated fuel path 191 is coupled at an upstream end to the fuel tank 20, and coupled at a downstream end to the mechanical relief valve 23 and to the fluid regulator 12. The fluid flow passage 11 illustrated in FIG. 1 is incorporated into the evaporated fuel path 191.

The evaporated fuel path 192 is coupled at an upstream end to the mechanical relief valve 23 and to the fluid regulator 12, and coupled at a downstream end to the canister 24.

The evaporated fuel path 193 is coupled at an upstream end to the canister 24, and coupled at a downstream end to the filter 22.

The evaporated fuel path 194 is coupled at an upstream end to the canister 24, and coupled at a downstream end to the purge valve 25.

An evaporated fuel path 195 is coupled at an upstream end to the purge valve 25, and coupled at a downstream end to the engine 26.

Figure 2B:
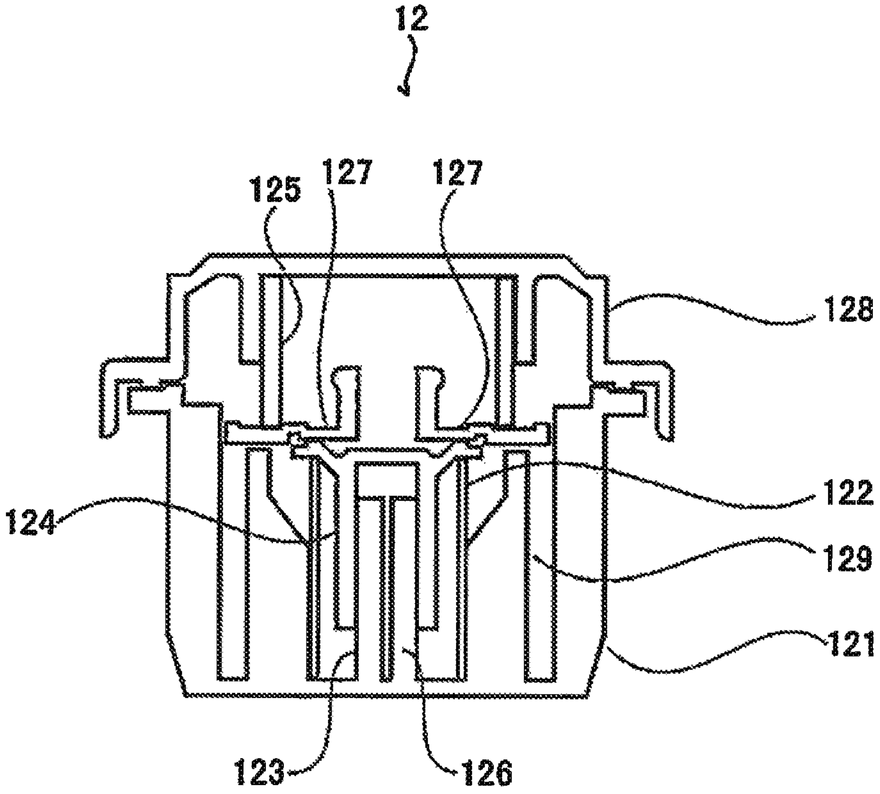
FIG. 2B is a cross-sectional of a fluid regulator that constitutes the pressure regulation device according to the embodiment of the present disclosure.

FIG. 2B is a cross-sectional view of the fluid regulator 12 constituting the pressure regulation device 10. The fluid regulator 12 is also referred to as hermetic valve.

The fluid regulator 12 includes a lower housing 121, an upper housing 128, an output shaft 126, a valve guide 123, a valve 124, a sealant 127, and a spring 125. The fluid regulator 12 is disposed between the evaporated fuel path 191 and the evaporated fuel path 192. By means of its opening and closing action, the fluid regulator 12 controls passage of a vaporized fuel generated from the fuel tank 20. Various parts of the fluid regulator 12 are made of injection-molded synthetic resin or other suitable material, except for a part such as a spring 122.

The lower housing 121 is a substantially lid-shaped component with an opening at the top.

The upper housing 128 is a substantially lid-shaped component with an opening at the bottom. The upper housing 128 and the lower housing 121 are mounted to each other such that each of the two housings closes the opening of the other.

An inner wall member 129 is defined by a part of the bottom surface of the lower housing 121 that is raised in a substantially cylindrical form.

The valve guide 123 is defined by a part, near the center, of the bottom surface of the lower housing 121 that is raised in a substantially cylindrical form.

The output shaft 126 is a shaft-shaped component inserted into the valve guide 123 from below. For example, based on an instruction from a controller (not illustrated), the output shaft 126 is rotated by a drive force from a motor.

The valve 124 has a substantially cylindrical shape. The valve guide 123 is to be inserted into the valve 124.

The spring 122 is disposed in the lower housing 121. The spring 122 is in contact at its bottom end with the lower surface of the lower housing 121, and in contact at its top end with the valve 124. The spring 122 urges the valve 124 upward inside the fluid regulator 12.

The sealant 127 has a substantially annular shape. The sealant 127 is disposed on or above the valve 124. The valve 124 urged by the spring 122 comes into contact with an inner part of the lower surface of the sealant 127. The top end of the inner wall member 129 comes into contact with an outer part of the lower surface of the sealant 127.

The spring 125 is disposed in the upper housing 128. The spring 125 is in contact at its top end with the lower surface of the upper housing 128, and in contact at its bottom end with the sealant 127. The spring 125 urges the sealant 127 downward inside the fluid regulator 12.

When the fluid regulator 12 is in its closed state, displacement of the output shaft 126 causes the lower surface of the sealant 127 to be in contact with the top end of the inner wall member 129. This causes the evaporated fuel paths 191 and 192 illustrated in FIG. 2A to be in a non-communicating state. As a result, no evaporated fuel is supplied from the fuel tank 20 to the canister 24.

When the fluid regulator 12 is in its open state, displacement of the output shaft 126 in the reverse direction causes the valve 124 and the sealant 127 to move upward. The lower surface of the sealant 127 thus moves out of contact with the top end of the inner wall member 129. This causes the fluid regulator 12 to allow communication between the evaporated fuel paths 191 and 192.

Reference is now made to operation of the tank-pressure regulation device 18 configured as described above.

When the fluid regulator 12 is in its closed state, the evaporated fuel path 191 is blocked, and the pressure inside the fuel tank 20 is thus maintained.

In drawing out the evaporated fuel in the fuel tank 20 into the canister 24 prior to feeding of the fuel tank 20, the fluid regulator 12 is brought into an open state. Referring now to FIG. 2A, as the fluid regulator 12 becomes open, the evaporated fuel is supplied from the fuel tank 20 to the canister 24 by way of the evaporated fuel path 191, the fluid regulator 12, and the evaporated fuel path 192.

For combustion operation of the engine 26, the purge valve 25 is brought into its closed state. Referring now to FIG. 2A, the opening of the purge valve 25 causes fuel components in the canister 24 to be supplied to the engine 26 by way of the evaporated fuel path 194, the purge valve 25, and the evaporated fuel path 195. The supplied fuel components are used for combustion operation of the engine 26, together with the fuel to be injected into the cylinder of the engine 26.

The pressure regulation device 10 illustrated in FIG. 1 is interposed in the evaporated fuel path 191 illustrated in FIG. 2A. In other words, at least a portion of the evaporated fuel path 191 illustrated in FIG. 2A is defined by the fluid flow passage 11 illustrated in FIG. 1. Each of the wall members 131 to 133 illustrated in FIG. 1 is located at some point in the interior of the evaporated fuel path 191 illustrated in FIG. 2A.

As a result, even if the extracts 15 arise in the evaporated fuel path 191 as an evaporated fuel generated in the fuel tank 20 passes through the evaporated fuel path 191, the wall members 131 to 133 capture the extracts 15. This helps to prevent the extracts 15 from entering the fluid regulator 12.

Referring now to FIG. 2B, the above-mentioned configuration helps to reduce the risk that the extracts 15 may, inside the fluid regulator 12, impede the movement of movable parts such as the spring 122 and the valve 124. This in turn helps to reduce the risk of the negative pressure flow rate in the fuel tank 20 becoming less than or equal to a specified value, and also prevent false illumination of a warning light caused by the negative pressure in the fuel tank 20 becoming less than or equal to a specified value.

Figure 3:
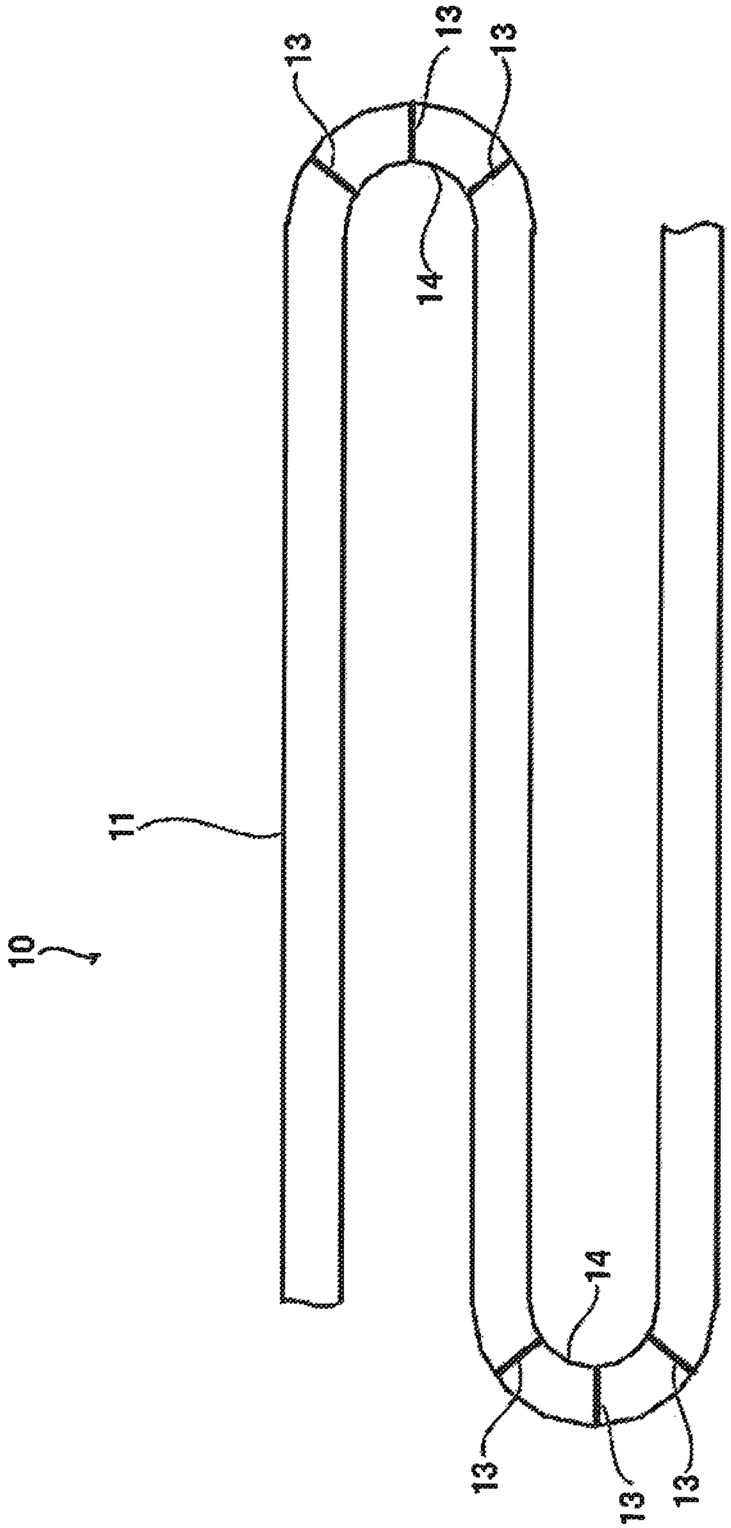
FIG. 3 is a schematic diagram illustrating a pressure regulation device according to an embodiment of the present disclosure.

FIG. 3 is a schematic diagram illustrated in the pressure regulation device 10 according to another embodiment. The fluid flow passage 11 has curved portions 14. Each of the curved portions 14 is located at a point in the fluid flow passage 11 where the fluid flow passage 11 turns around substantially 180 degrees. The fluid flow passage 11 has two such curved portions 14.

The wall members 13 are disposed in the curved portions 14. In the present example, each single curved portion 14 is provided with three wall members 13. This allows the curved portions 14 of the fluid flow passage 11 to be reinforced by the wall members 13.

Although an embodiment of the disclosure has been described above, the embodiment is not intended to be limiting of the disclosure but may allow various changes or modifications without departing from the scope of the disclosure. Various aspects or features of the disclosure described above may be combined with each other.

Although the embodiment described above is directed to an example where the pressure regulation device 10 constitutes a portion of the tank-pressure regulation device 18, the pressure regulation device 10 may be incorporated into another mechanism. For example, the pressure regulation device 10 may be employed for a conduit through which a vaporized brake fluid passes in an automobile brake mechanism. This helps to prevent the extracts 15 from impeding the operation of the brake mechanism.

The pressure regulation device according to the embodiment of the present disclosure includes at least one wall member that stands from the interior wall of the fluid flow passage. As a result, even if extracts arise from the fluid flow passage and appear inside the fluid flow passage, the extracts can be captured by the wall member. This helps to reduce the risk of the extracts reaching the fluid regulator. This in turn helps to prevent the extracts from adhering to the fluid regulator, and consequently reduce potential malfunction of the fluid regulator.

The invention claimed is:

1. A pressure regulation device configured to regulate a pressure of a fluid that flows in the pressure regulation device, the pressure regulation device comprising:

a fluid flow passage in which the fluid flows, the fluid flow passage including a conduit extending along a longitudinal axis;

a fluid regulator disposed in the fluid flow passage and configured to regulate a pressure of the fluid; and a plurality of wall members disposed upstream of the fluid regulator in a flow of the fluid and disposed in a direction of flow of the fluid, the plurality of wall members standing from an interior wall of the conduit, wherein the plurality of wall members extend from the interior wall of the conduit toward a center of the conduit, wherein each of the plurality of wall members has a hole through which the fluid is allowed to flow toward the fluid regulator, wherein the conduit has a bent portion where the longitudinal axis is bent, and wherein the plurality of wall members are disposed in the bent portion.

2. The pressure regulation device according to claim 1, wherein, in each of the plurality of wall members, the hole is located at a different position.

3. The pressure regulation device according to claim 1, wherein the bent portion comprises bent portions, and wherein each of the bent portions is provided with the plurality of wall members.

4. The pressure regulation device according to claim 2, wherein the bent portion comprises bent portions, and wherein each of the bent portions is provided with the plurality of wall members.

5. The pressure regulation device according to claim 1, wherein the plurality of wall members and the conduit are integrally molded from a same synthetic resin.

* * * * *